ically of the side panels 12 such that the front easel 18 may be pivoted upon the axis in a forward or

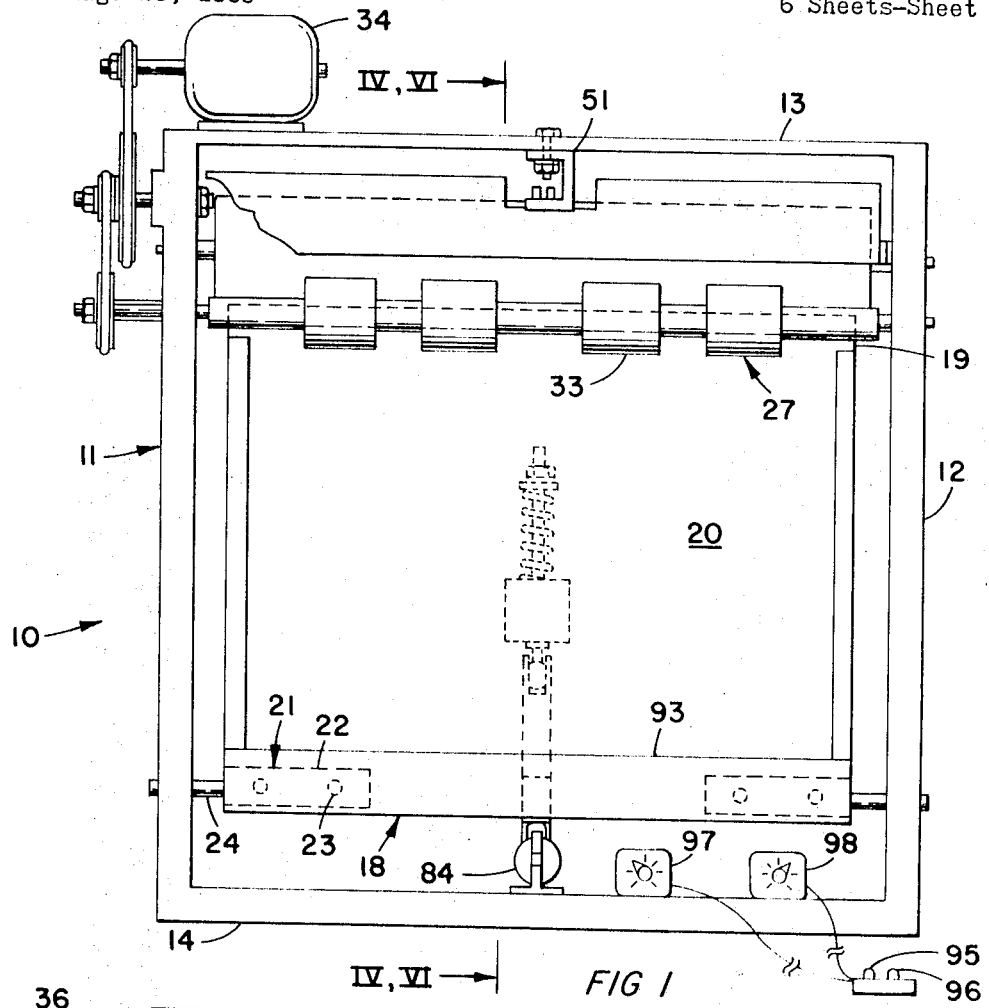
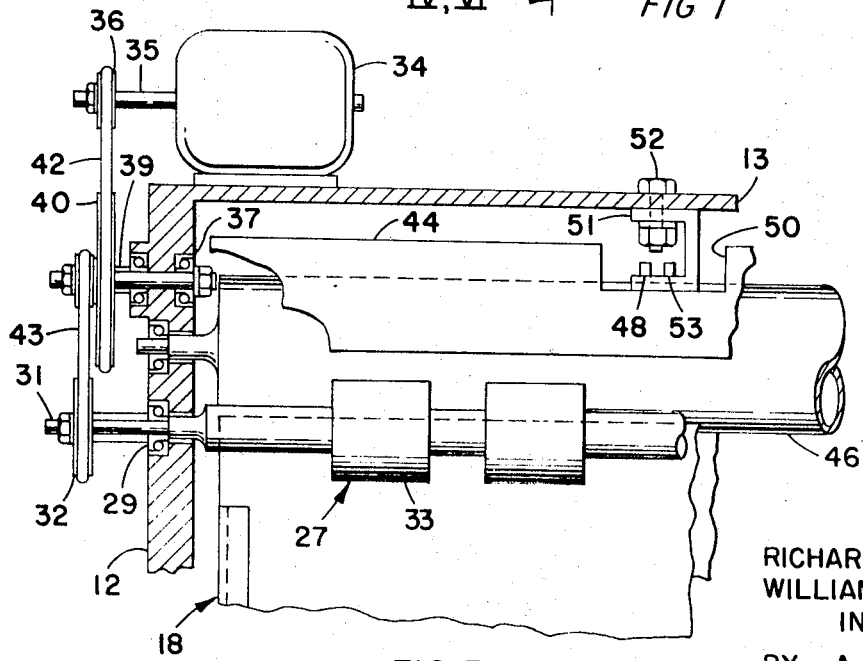

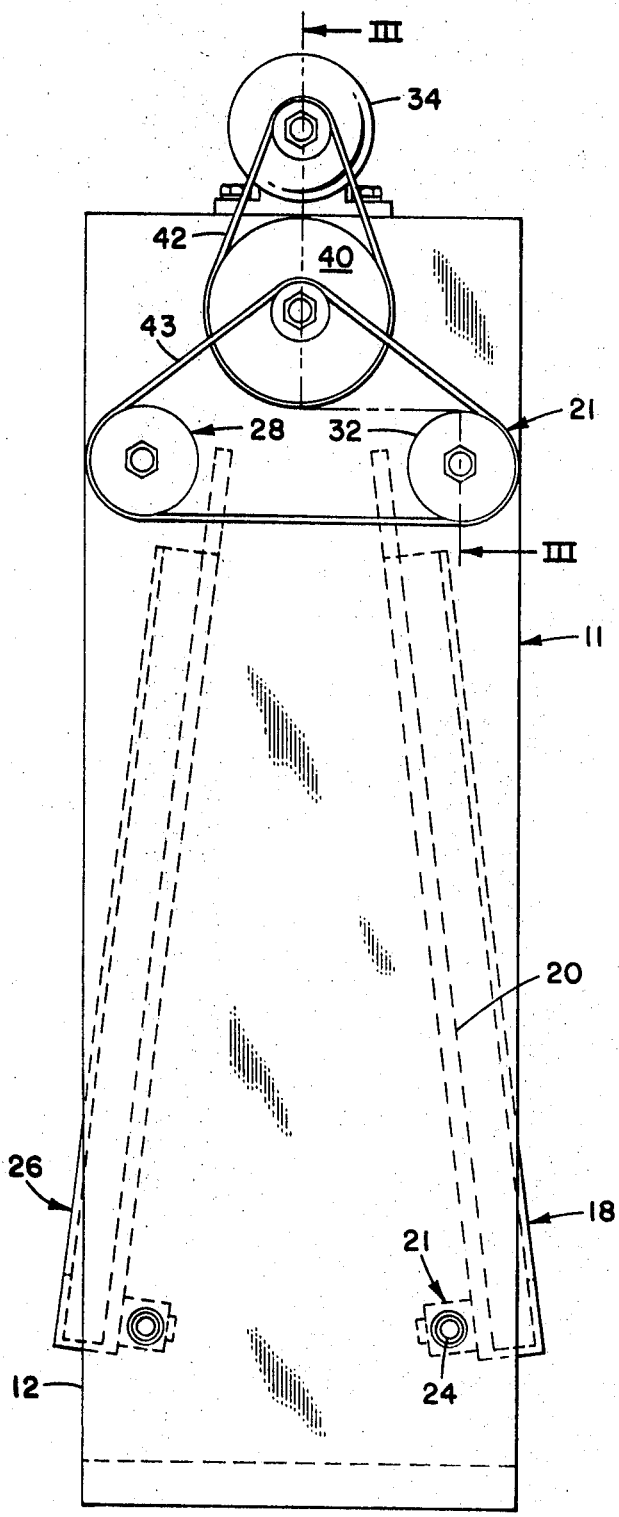
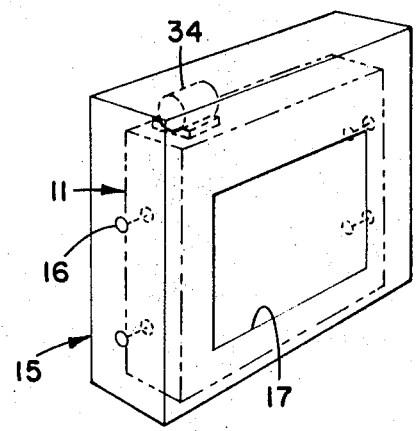
FIG 2
FIG 8
RICHARD M. JOHNSON
WILLIAM G. REDMOND
INVENTORS
BY James M. Cate
ATTORNEY

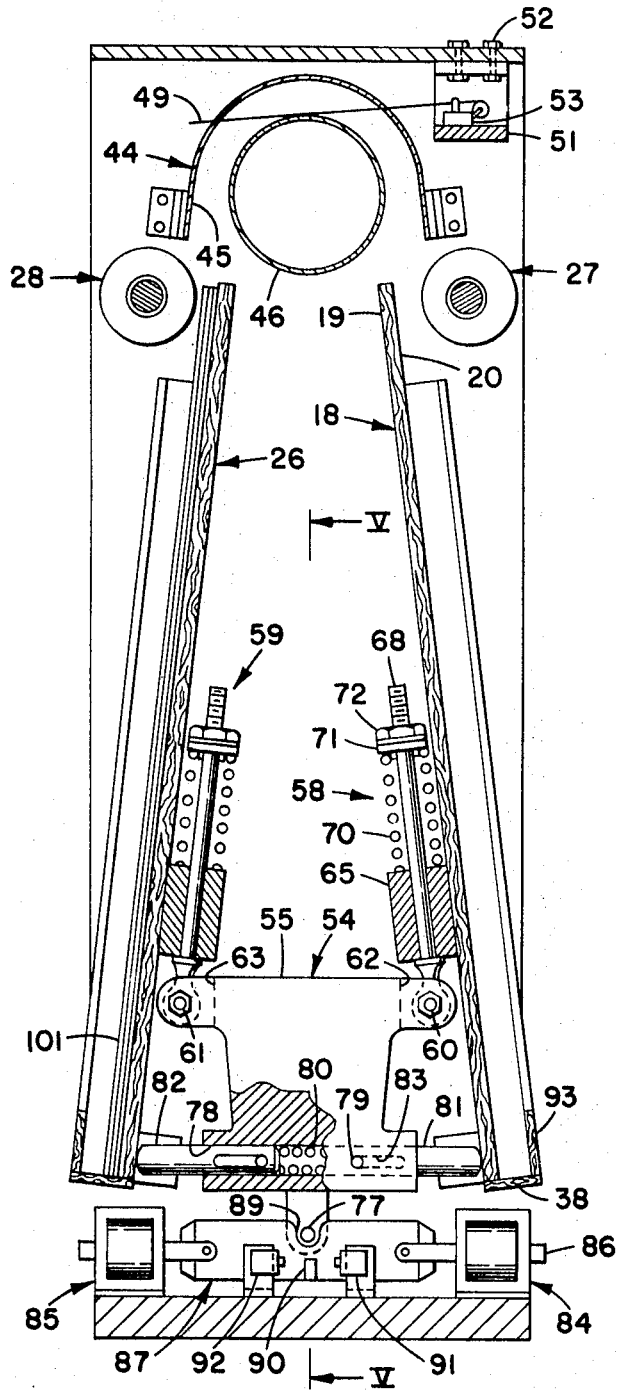
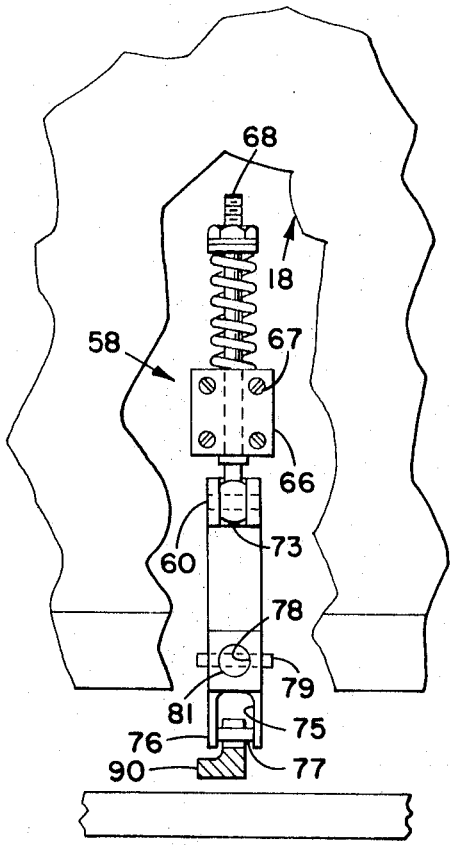
FIG 5
FIG 4
RICHARD M. JOHNSON
WILLIAM G. REDMOND
INVENTORS
BY James M. Cate
ATTORNEY

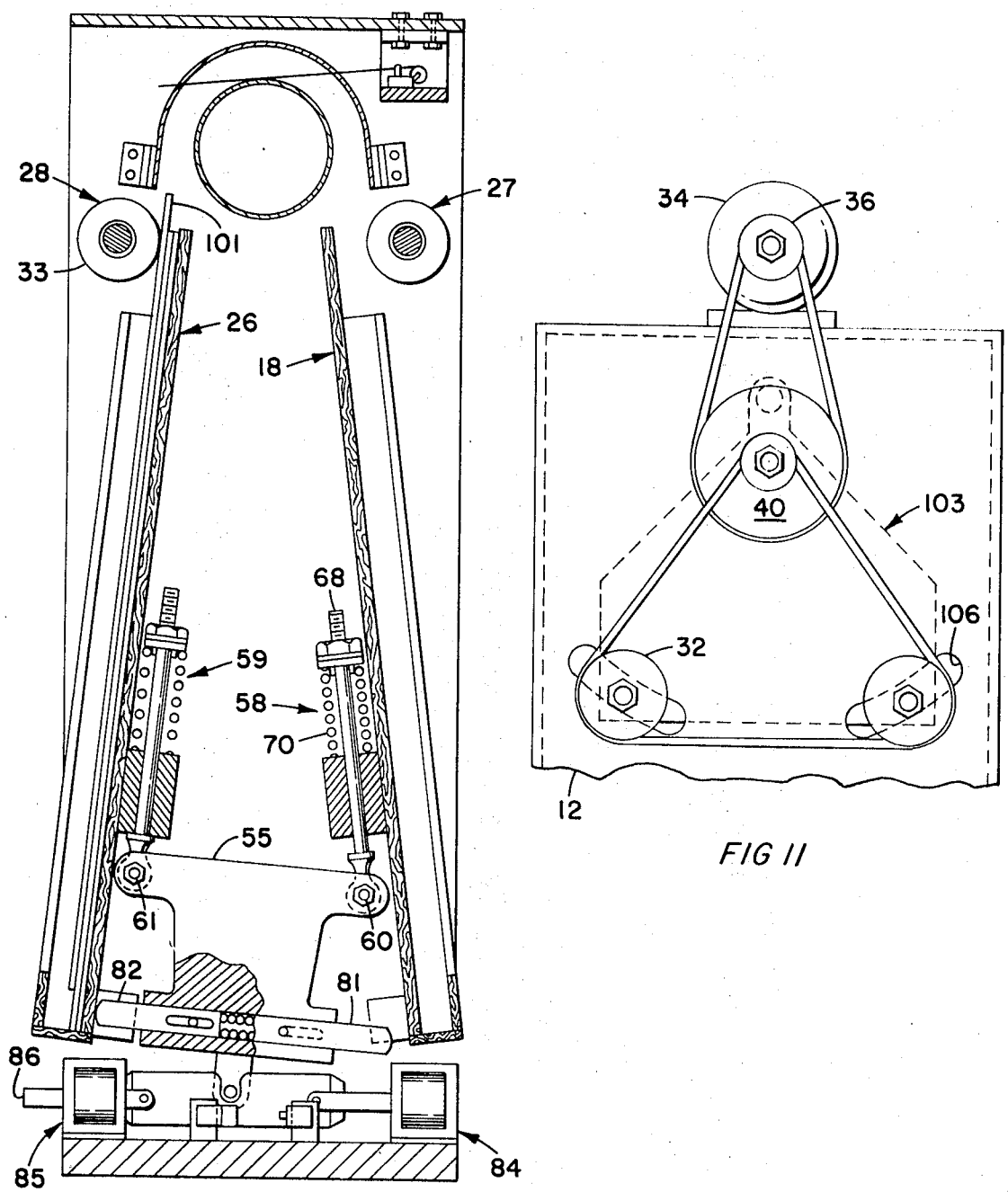

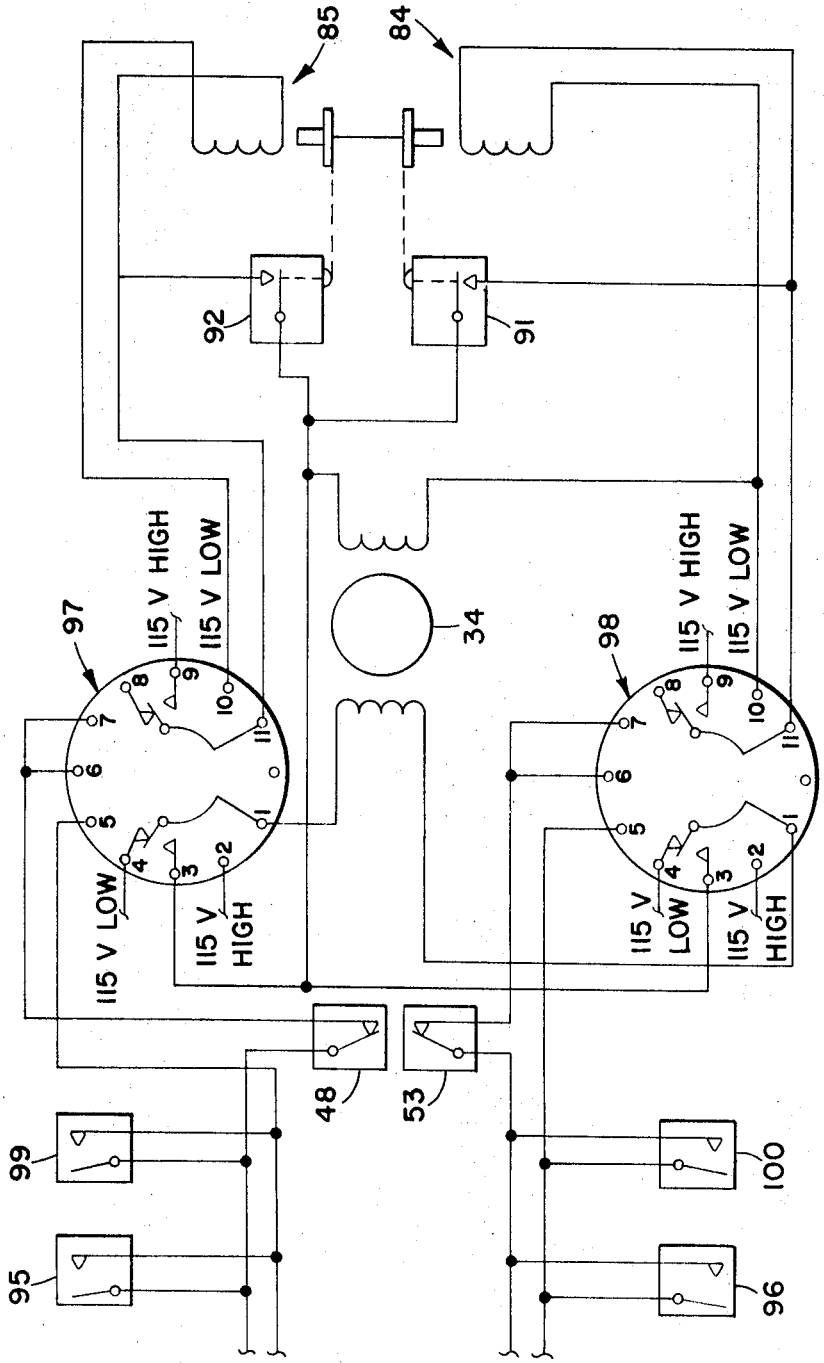

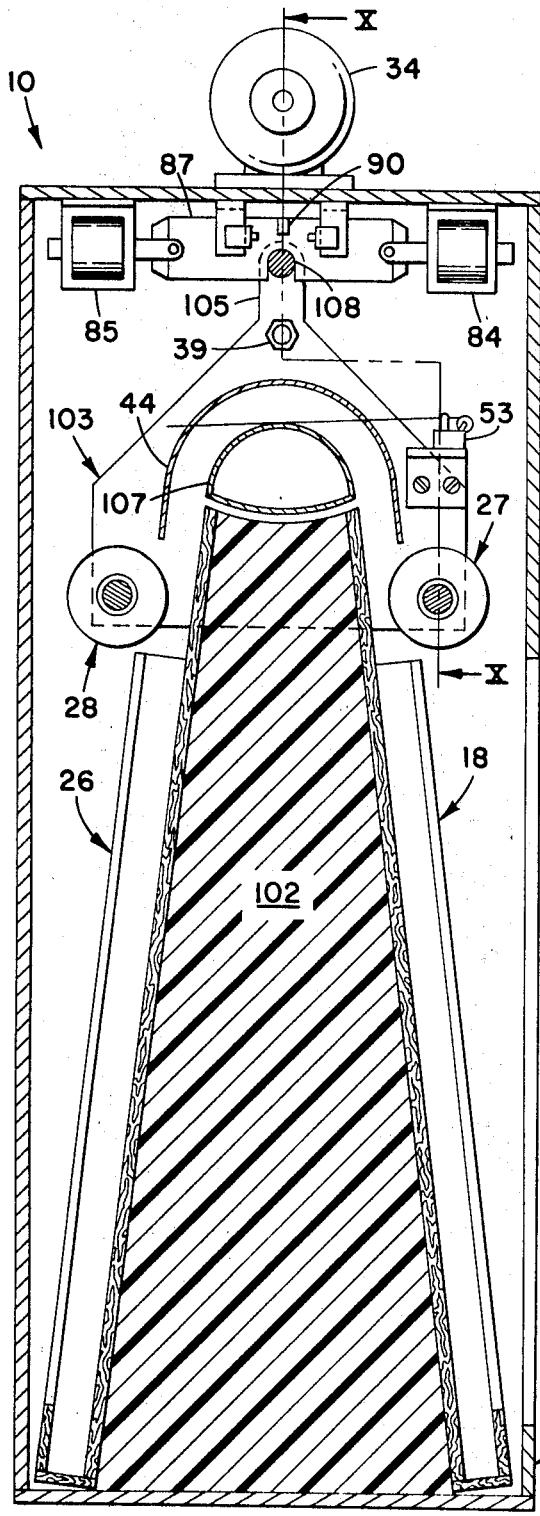

United States Patent Office 3,613,276
Patented Oct. 19, 1971

3,613,276
CHART DISPLAY APPARATUS
Richard M. Johnson and William G. Redmond, Dallas, Tex., assignors to LTV Electrosystems, Inc., Greenville, Tex.
Filed Aug. 28, 1969, Ser. No. 853,867
Int. Cl. G09f *11/30*
U.S. Cl. 40—36            14 Claims

ABSTRACT OF THE DISCLOSURE

An apparatus for successively exhibiting a plurality of charts includes first and second means for supporting the charts in parallel alignment, the first and second supporting means being positioned such that the charts on one supporting means are adjacent and approximately parallel to any charts on the second supporting means but facing in an opposite direction, and means for sliding the outer chart from either of the supporting means against a deflecting shield and onto the other supporting means. Provision is made for reversing the sequence such that previously shown charts may be repeated.

---

This invention relates to chart display apparatus and, more particularly, to an apparatus for successively and selectively exhibiting individual ones of a plurality of charts.

Although display devices have been developed which are capable of sequentially exhibiting a plurality of display charts or cards, they have suffered from several limitations. Such devices typically operate by removing a chart from one side of a stack of charts, transporting it to a display position in which it may be viewed, and then returning it to the other side of the stack of charts while removing another chart from the first side and thus continuing sequentially through the stack of charts. While this procedure may be satisfactory for an advertising display device in which a given series of charts is to be repeatedly exhibited, it could not be employed in an application wherein it is necessary to be able to reverse the sequence in order to repeat the showing of a previously shown chart. Such a capability is particularly important when the display apparatus is to be used as an instructional device or for other uses in which it may be necessary to repeat various charts in response to questions or for comparison or reviewed. A further disadvantage of many of the previous display devices is that their operating mechanisms are undesirably complex and expensive to manufacture. For example, often a chart must be engaged by a series of rollers and guides; this is disadvantageous in that each roller must be carefully aligned to properly grip the charts, and a plurality of rollers thus has an undesirably great probability of malfunctioning.

It is, accordingly, a major object of the present invention to provide a new and improved apparatus for sequentially exhibiting a plurality of charts.

A further object of the present invention is to provide such an apparatus which is capable of quickly returning to view previously exhibited charts without requiring the exhibiting of the remaining charts.

Still another object is to provide such an apparatus which is of simple, reliable, and relatively inexpensive design.

Other objects and advantages will be apparent from the the specification and claims and from the accompanying drawing illustrative of the invention.

In the drawing:

FIG. 1 is a front elevational view, partially cut away, of an embodiment of the invention;

FIG. 2 is a side elevational view of the embodiment of FIG. 1;

FIG. 3 is an enlarged, fragmentary view of the device of FIG. 1 similar to FIG. 1 but partially in section;

FIG. 4 is a cross-sectional view, partially cut away, taken in the plane designated by the line IV, VI–IV, VI in FIG. 1;

FIG. 5 is a fragmentary view of the device as shown in FIG. 1, but with a portion of the front easel cut away for clarity;

FIG. 6 is a view similar to FIG. 4 but with portions of the apparatus shown in their rearward position;

FIG. 7 is a schematic diagram of circuitry employed in the apparatus;

FIG. 8 is a reduced, perspective view showing the apparatus of FIG. 1 encased in a decorative, outer housing;

FIG. 9 is a view similar to FIG. 4 and showing a modification of the embodiment shown in FIGS. 1–8;

FIG. 10 is a fragmentary, partially sectional view taken as at line X—X of FIG. 9; and FIG. 11 is a fragmentary, side view of the modified embodiment shown in FIGS. 9 and 10.

With reference to FIG. 1, a first, exemplary embodiment of the display apparatus 10 comprises a support structure 11 having two, mutually spaced, parallel sidewalls 12, the sidewalls extending vertically between and perpendicularly of a top panel 13 and a base panel 14 and suitably formed integrally with the top and base panels. The base panel 14 has a lower surface adapted to seat upon a floor surface such that the display apparatus 10 may be used in a portable or floor-standing mode as well as in an application in which it is permanently mounted. Alternatively, legs (not shown) may be attached to the support structure 11 for raising the display apparatus 10 to provide better visibility. The support structure 11 and various mechanisms, to be described, which are attached thereto are preferably enclosed by an outer, decorative housing 15, as shown in FIG. 8, the outer housing being affixed to the support structure as by struts 16 and having a front viewing window 17 which is aligned in register with the front easel of the display apparatus, as will be described. Referring again to FIG. 1, a front easel 18 has an rectangular rear panel 19 suitably of plywood and having a substantially flat front face 20, the front easel being pivotally mounted within the support structure 11, as will be described. With added reference to FIG. 4, each easel 18, 26 is provided with a lower ledge 38 extending horizontally across the easel at its lower edge and projecting outwardly from the front face 20 for supporting any charts 101 (to be described) on the easel. A front border 93 projects upwardly from the distal edge of the ledge 38 for restraining the charts 101 on the easel and, as shown in FIG. 1, the ledge and border are continued upwardly along the major portion of both sides of the easel.

The front easel 18 is pivotally connected to the sidewalls 12 by means of two, elongated, axle structures 21 which are affixed to the rear side of the rear panel 19 adjacent the two lower corners thereof, respectfully, by means such as bolts 23. Each axle structure 21 is suitably of square cross-sectional configuration at a portion thereof adjacent the easel 18, as shown more clearly in FIG. 2, but has a cylindrical portion 24 which projects linearly from the square portion and perpendicularly toward and through the respective adjacent sidewall 12. At each sidewall 12, a bearing 25 is seated within a bore formed through the respective sidewall 12 and is adapted to receive the cylindrical portion 24 of the adjacent axle structure 21, both bearings and cylindrical portions being positioned coaxially upon an axis extending horizontally and perpendicularly of the side panels 12 such that the front easel 18 may be pivoted upon the axis in a forward or rearward direction with respect to its front face 20. As shown in FIGS. 2 and 4, a similar, second or rear easel 26 is similarly connected to the support structure 11 upon a pivotal axis parallel to and behind that of the front easel, and the rear easel is mounted approximately in register with the front easel 18 but facing in an opposite, or rearward direction. The easels 18, 26 are supported in their upright positions and mutually connected by linkage means, to be described, and are shown in a neutral or centered position both easels being sloped inwardly or toward each other at their upper portions to facilitate the support of charts 101 (FIG. 4) to be displayed. Alternatively, the front face 20 of each easel 18, 26 has a slight degree of concave curvature, from top to bottom, to further ensure that the charts 101 will seat uniformly against the easels 18, 26. The charts may be of plastic or flexible cardboard, a preferred material being polyester film of approximately .007 inch thickness, and they should be of approximately equal heights, for reasons which will become apparent.

Mounted between the sidewalls 12 are front and rear roller structures 27, 28 positioned adjacent the front faces of the front and rear easels 18, 26, respectively, and with the central axis of each roller structure 27, 28 disposed slightly below the top of the adjacent easels 18, 26 and below the upper edges of any charts 101 on the easels. As shown most clearly in FIGS. 1 and 3, the front roller structure 27 extends horizontally between the two sidewalls 12 and is rotatably mounted, at each end, to the respective adjacent sidewall by a respective bearing 29 (FIG. 3) seated within a bore formed through the sidewall. The front roller structure 27 (identical to the rear roller structure) comprises an axle 30 which has, projecting from each end thereof, a coaxial, cylindrical portion 31 of reduced diameter which extends through and seats within the adjacent bearing 29; the projecting portion 31 on one end of the axle 30 (on the left end, as viewed in FIGS. 1 and 9) is of sufficient extension that it extends through and past the respective sidewall 12 to permit the mounting, on the extending portion, of a pulley 32, the pulley being coaxially affixed thereto. At least one, cylindrical, friction roller 33 is coaxially and fixedly mounted on the axle 30, the roller being of a material having a high coefficient of friction, such as silicon rubber. In the preferred embodiment, four such rollers 33, mutually spaced, are employed for each axle 30. As shown in FIG. 2, the front axle structure 27 is located adjacent the front edge of the sidewall 12 and in line horizontally with the rear axle structure 28, which itself is located adjacent the rear edge of the sidewall.

A reversible motor 34 (FIG. 3), suitably of the type manufactured by the Bodine Electric Co., Chicago, Ill. as type "N S1-12," is mounted atop the top panel 13 for rotatably driving the roller structures 28, 27, the motor 34 being mounted with its drive shaft 35 extending parallel to and horizontally between the axles 30 of the front and rear roller structures 27, 28. A driving pulley 36 is mounted on the motor shaft 35 and is drivingly connected to the roller structures 27, 28 through a speed-reducing pulley mechanism, comprising an axle 39 which is rotatably mounted to the adjacent sidewall 12 by bearings 37 at a location directly beneath the motor shaft 35 and above and between the front and rear roller structures 27, 28, there being a relatively large pulley 40 fixedly and coaxially mounted on the axle 39 in vertical alignment beneath the relatively smaller driving pulley 36. A relatively small pulley 41 is also mounted on the rotatable axle 39 beside the large pulley 40 and in line with the large pulleys 32 mounted on the front and rear roller structures 27, 28. A first driving belt 42, suitably a rubber O-ring or V-belt, is connected between the driving pulley 36 and the large pulley 40, and a second driving belt 43 is connected between the small pulley 41 and around both roller pulleys 32. Thus, the roller structures 27, 28 are connected such that they may rotate in the same rotational direction as the motor 34 but at a relatively reduced speed.

Referring to FIG. 4, a deflecting shield 44 of approximately semi-cylindrical configuration is fastened between the sidewalls 12 and aligned with its central, longitudinal axis extending parallel to and centered above the front and rear roller structures 27, 28. The concave surface 45 of the shield 44 is faced downwardly and is of a relatively low coefficient of friction, the two lower edges formed by the shield 44 extending horizontally and parallel to and above the respective, adjacent roller structures 27, 28. The deflecting shield 44 is also positioned, relative to the roller structures 27, 28, such that the plane defined by either of the front faces 20 of the front and rear easels 18, 26 upon the easel being in contact with the respective, adjacent, roller structure 27, 28 would, if extended, intersect the inner surface 45 of the deflecting shield 44 along a line parallel to, adjacent to, and immediately above the respective adjacent lower edge of the shield 44. Thus, the deflecting shield 44 is aligned such that a chart 101 seated upon one of the easels and moved along the front face 20 and upwardly toward the shield is deflected by the concave surface 45. A tubular roller 46 also extends parallel to and centrally above the front and rear roller structures 27, 28 and, as shown most clearly in FIG. 3, is rotatably mounted to the sidewalls 12 by axles extending coaxially from each end of the tubular roller and seated within bearings affixed within the sidewalls 12. The tubular roller 46 is of a relatively low inertia, being formed of a lightweight material such as aluminum, and is freely rotatable about is axis. As shown most clearly in FIG. 4, the tubular roller 46 is disposed coaxially within the deflecting shield 44 and is spaced from the inner surface 45 of the deflecting shield 44 by a distance, for example, of approximately one to two inches, the tubular roller 46 of the present illustrative embodiment suitably being of a diameter of approximately 4 to 5 inches. First and second, normally closed microswitches 48, 53 (FIG. 3) are mounted adjacent the tubular roller 46 and the deflecting shield 44 upon a support 51 which is suitably affixed to the top panel 13 by bolts 52. Each microswitch 48, 53 has an indicator wire 49, as shown in FIG. 4 with respect to the second microswitch 53, which extends horizontally toward and above the tubular roller 46, there being a cutout 50 (FIG. 3) formed through the top of the deflecting shield 44 to permit passage therethrough of the indicator wires 49. The second microswitch 53 is disposed, as is the first microswitch, with its indicator wire 49 normally in contact with the top of the tubular roller 46, the microswitches being adjusted such that they are closed upon the indicator wires 49 resting upon the roller 46 but open upon the wires 49 being raised from that position by any object passing between the tubular roller 46 and the deflecting shield 44. (The circuitry connecting the microswitches 48, 53 and other components will be described below.)

Mounted between the front and rear easels 18, 26 and on the rear panels 19 of the front and rear easels 18, 26, respectively, are front and rear bungee spring structures 58, 59. Each spring structure 58, 59 comprises an elongated body 65 of rectangular cross-section and having a bore formed linearly therethrough, the body being bolted, as shown more clearly in FIG. 5, to the respective, adjacent, rear easel panel 19 by bolts 67. Front and rear plunger rods 68, 69 are slideably mounted within the bores of the rectangular bodies 65 of the front and rear spring structures 58, 59, respectively, the rods 68, 69 being closely fitted within the rectangular bodies 65 such that the rods 68, 69 are not free to move substantially other than in a linear direction. A compressed coil spring 70 is mounted coaxially around each rod 68, 69, respectively, and seated against and above the respective body 65, and a washer 71 and nut 72 are connected immediately above each spring 70, the rods 68, 69 having upper, externally threaded portions formed thereon for receiving the nuts 72. A respective eyelet 73 is formed on the lower end of each of the rods 68, 69, and a respective flange 74 is formed circumferentially around each rod between the eyelet 73 and the body 65 for seating against the body to limit upward movement of the respective rod 68, 69. Rotation of the nut 72 thus permits adjustment of the force exerted by the compressed spring 70. The bodies 65 of the front and rear spring structures 68, 69 are positioned, with respect to the rear panels 19 of the easels 18 and 26 and as indicated in FIG. 1 with respect to the front spring structure 69, at the approximate, horizontal center of the respective rear panel 19 and, in the present exemplary embodiment, at a vertical distance above the pivotal axis 21 of approximately 20 to 30 percent of the easel height. Each rectangular body 65 is oriented such that its plunger rod 68 extends and is slideable parallel to the front face 20 of the respective associated easel 18, 26 and vertically as viewed from a position in front of the easel or as shown in FIG. 1.

Referring to FIG. 4, the front and rear easels 18, 26 are connected through an approximately bellcrank or triangularly shaped link 54, the bellcrank link comprising a linkage plate 55 which is disposed with its major side surfaces parallel to and equidistance from a vertical plane perpendicular to, and disposed centrally of, the front faces 20 of the front and rear easels 18, 26. As viewed in FIG. 4, the linkage plate 55 has right and left, top pivotal connections, termed, hereinafter, front and rear connections, which include front and rear axles 60, 61 respectively engaged by the eyelets 73 of the front and rear bungee springs 58, 59. Front and rear cutout portions 62, 63, comprising slots cut centrally of the thickness of the linkage plate 55 and into the upper front and rear corner portions thereof, receive the eyelets 73, as shown most clearly in FIG. 5, and the front and rear axles 60, 61 extend perpendicularly across the thickness of the linkage plate 55, across the front and rear cutout portions 62, 63, respectively, and through eyelets 73 such that the plate 55 may pivot about the axles 60, 61.

The linkage plate 55 also has, at its lowermost portion, a lower cutout 75 equidistance from and similar to the front and rear cutouts 62, 63, the lower cutout, as shown in FIG. 5, being formed vertically in a downwardly projecting, nodal extension of the linkage plate 55 and centrally of the thickness of the plate 55 such that parallel leaves 76 are formed thereby. A bolt 77 is connected across the lower cutout 75, there being suitable bores formed through the leaves 76 to receive the bolt, and the bolt is aligned parallel to the front and rear axles 60, 61 of the front and rear cutouts, 62, 63.

Adjacent and above the lower cutout 75, a bore 78 is formed centrally of the thickness of the linkage plate 55 and, upon the easels 18, 26 being in their neutral positions as shown in FIG. 4, extending horizontally through the plate from one edge to the opposite edge. Two pins 79 are connected through the plate 55 and centrally across the bore 78 and disposed above and to either side of the lower cutout portion 75. Between the pins 79, a coiled, centering spring 80 is seated coaxially within the bore 78. Adjacent the respective ends of the centering spring 80, front and rear, cylindrical plungers 81, 82 are slideably mounted within the bore 78, each plunger having, adjacent the end of the respective plunger most closely adjacent the centering spring 80, a respective, linearly extending slot 83 formed centrally through each plunger for receiving the respective, adjacent pin 79. Thus, the plungers 81, 82 are slideably mounted within the bore 78 such that linear travel of each plunger is limited to the length of its slot 83. The centering spring 80 urges the plungers 81, 82 outwardly from the linkage plate 55 and into contact with the rear panels 19 of the front and rear easels 18, 26.

Mounted on the base panel 14 immediately below the linkage plate 55 are front and rear solenoids 84, 85; for example, type 18 AC solenoids manufactured by the Guardian Electric Company, Chicago, Ill. are suitable. The solenoids 84, 85 are mounted at front and rear portions of the base panel 14 and adjacent, respectively, the front and rear easels 18, 26. The plungers 86 of the solenoids 84, 85 are coaxially aligned and are joined by an elongate, rectangular connecting bar 87 which is affixed, at each end, to a respective one of the plungers 86. The connecting bar 87 is aligned parallel to the linkage plate 55 and positioned such that an upper portion thereof seats within the lower cutout 75 of the linkage plate 55, the connecting bar also having, at its midpoint, a notch 89 cut downwardly from its upper edge and across its upper thickness, the notch being of sufficient width, along the length of the connecting bar 87, to receive the bolt 77 extending across the lower cutout 75. The notch 89 is of sufficient depth to allow pivotal movement of the linkage plate 55 about the pivotal axles 60, 61 upon the plate being urged forwardly or rearwardly by the solenoids 84, 85, as will be described more fully hereinafter. Affixed to one side of the connecting bars 87 at a lower portion thereof directly beneath the notch 89 is a projecting stud 90. Mounted on the base panel 14 alongside of the connecting bar 87 are front and rear, normally open microswitches 91, 92, the microswitches having sensing buttons directed toward each other and toward the lug 90. The microswitches 91, 92 are located, relative to the solenoids 84, 85, such that, as the rear solenoid 85 is actuated, as will be described in detail below, such that it pulls the connecting bar 87 toward it until the solenoid "bottoms" or completes its stroke, the rear microswitch 91 is closed by contact with the lug 89. Similarly, the front microswitch 91 is located such that the lug 90 contacts the actuating button of the front microswitch and closes the front microswitch upon the front solenoid 84 "bottoming," or upon its plunger 86 reaching its fully retracted position.

Referring to FIG. 7, the electrical circuit comprises first and second time delay relays 93, 94 for controlling the length of time current is applied to the solenoids 84, 85 and to the motor 34. A suitable relay having a ten second maximum delay period is model CHB 38-70001 of the Potter & Brumfield Division, Princeton, Ind. of American Machine and Foundry Company. Pins 2 and 4, respectively, of each relay 97, 98 are connected ot high and low terminals of a 115 v. AC power source, as are pins 9 and 10. respectively. As shown in FIG. 1, the time delay relays 97, 98 are suitably positioned beneath the easels 18 upon the base panel 14 so that their timing controls are conveniently accessible and such that they may be easily connected to forward and rearward, normally open control switches 95, 96. As shown in FIG. 7, the first forward control switch 95 is connected in series with pins 5 and 7 of the first time delay relay 97. The first microswitch 48 is connected in series between pin 7 and the forward control switch 95. Output pins 10 and 11 of the first time delay relay 97 are connected, respectively, to either pole of the rear solenoid 85, pin 11 also having connection, across the rear microswitch 92, to pin 3 which is, in turn, connected to pin 3 of the second time delay relay 98.

Additional control switches 99, 100 are optionally connected in parallel with the control switches 95, 96, respectively, if desired for permitting additional control stations. Alternatively, a wireless transmitter, for example, an ultrasonic transmitter (not shown) of the type used for remote control of home television sets, may be additionally used to actuate either of the time delay relays 97, 98, in which case, and with respect to each time relay, an ultrasonic receiver is electrically connected to a suitable relay station connected across pins 6 and 5 in parallel with the control switches 95, 96, respectively.

The second time delay relay 98 is identical to the first relay 97 and has connection to the front solenoid 84 from pins 10 and 11 similar to that of the first relay 97 with respect to the rear solenoid 85, the second relay also having similar connection to the front microswitch 91, and a rearward control switch 96 and alternate rearward control switch 100. Pin 10 of the second relay 98 is connected across one coil of the motor 34 to pins 3 of the first and second relays 97, 98, and pin 1 of the second relay 98 is connected across the other motor coil to pin 1 of the first relay 97. As in the first relay 97, pins 2 and 9 of the second relay 98 are connected to the high terminal of an AC power source, and pins 4 nad 10 are connected to the low terminal of an AC power source.

While only one embodiment of the invention is shown and described in detail, it will be evident to those skilled in the art that various modifications thereof are possible without departing from the scope of the invention. For example, and with reference to FIG. 9, a modified or second embodiment of the display apparatus 10 is similar to the first embodiment but differs therefrom in that the front and rear easels 18, 26 are stationary, relative to the support sructure 11, and the front and rear roller structures 27, 28 are relatively moveable toward and away from the respective, adjacent easels. The front and rear easels 18, 26 are mounted on the support structure 11 in an upright position substantially identical to the centered or neutral position described with respect to the first embodiment and shown in FIG. 4. Foamed, plastic material 102, such as polystyrene, is affixed to the support structure 11 and fills the space between the easels 18, 26 for supporting the easels and minimizing any vibration and noise occurring during operation. The motor 34 is mounted on and above the support structure 11, as in the first embodiment, and is connected to the front and rear roller structures by speed-reducing pulleys 36, 40, 41, 32 (FIGS. 10, 11) which are similar to pulleys 36, 40, 41, and 33 of FIG. 3 except that the relatively large and small pulleys 40, 41 are rotatably mounted on the supporting axle 39, the axle 39 extending through and being fixedly mounted within a suitable sleeve seated within the sidewall 32. The supporting axle 39 has sufficient extension beyond the respective adjacent sidewall 12 and within the support structure 11 (FIG. 10) for supporting a pivotal frame 103. The frame 103 comprises a flat plate which is suitably of approximately triangular configuration, in plan view, the upper portion being in the form of an upright, isosceles triangle and the lower portion being a rectangular, downward extension from the base of the triangle, the frame 103 being pivotally mounted on the axle 39 by a bearing 104 located centrally of the frame adjacent its upper corner, the frame being aligned perpendicularly of the axle and parallel to the respective adjacent sidewall 11. The frame 103 has an upwardly projecting portion 105 formed above its bearing 104. While the above-described configuration of the frame 103 is not critical, the frame should be symmetrical about a vertical axis through the axle 39 so that it will not tend to swing from its upright position. A second, similar frame (not shown) is similarly mounted on the opposite sidewall 11 such that it is in the line with, and parallel to, the first frame 103. The roller structures 27, 28 and deflecting shield 44 are connected to and between the two frames 103 in the same manner described with respect to their connection to the sidewalls 12 in the first embodiment, there being two slots 106 (FIGS. 10 and 11) wider than the extending portions 31 of the roller structures 27, 28 formed through the sidewall 11 which is adjacent the motor 34, the slots being adjacent respective ones of the roller structures 27, 28 and extending circumferentially about the pivotal axle 39 such that the extending portions 31 of the roller structures 27, 28 extend through the slots and such that the frames 103 are free to pivot to either direction for sufficient distance to permit contact between the roller structures 27, 28 and the respective, adjacent easels 18, 19.

A fixed, semicylindrical, inner deflecting shield 107 is connected between and to the frames 103 and, as shown in FIG. 9, is disposed coaxially within the shield 44. The front and rear solenoids 84, 85 are mounted on and beneath the top panel 13 and centrally between the frames 103, the connecting bar 87 being disposed such that its slot 89 is in the lower edge of the bar. The slot 89 engages a steel connecting rod 108 which extends perpendicularly between the frames 103 and is connected, at each end, to the upwardly projecting portion 105 of the respective, adjacent, frame. The projecting stud 90 of the bar 87 is positioned between the front and rear microswitches 91, 92 as described above with respect to the first embodiment. The first and second microswitches 48, 53 are mounted on one of the frames 103 such that their indicator wires may seat on the adjacent inner shield 107.

With reference to FIGS. 4 and 7 and to the first embodiment shown therein, in operation, and with a stack of charts 101 loaded in the rear easel 26, facing outwardly, and disposed with top side down, the forward control switch 95 (or the additional forward control switch 99) is closed by an operator to bring a chart into view. Assuming that the first microswitch 48 is closed, i.e., that there is no chart or other object located between the tubular roller 46 and the deflecting shield 44 which has urged the indicator wire 49 upwardly to open the switch 48, the first time delay relay 97 (FIG. 7) is actuated and current is supplied from pins 10 and 11 to the rear solenoid 85 for the period of time set on the first timer 97. With particular reference to FIG. 4, upon the rear solenoid 85 being actuated, its plunger retracts and the connecting bar 87 and the plunger of the front solenoid 84 are moved toward the rear solenoid. Hereinafter, movement of a component in such a direction will be termed "rearward" movement, and movement in the opposite direction, "forward" movement. The bolt 77 being seated within the notch 89, this rearward movement of the connecting bar 87 urges the bolt 77, the linkage plate 55, and the front and rear easels 18, 26 in a rearward direction and also tends to urge the linkage plate to pivot downwardly upon the rear pivotal axle 61. However, the adjusting nuts 72 are sufficiently tightened upon the bungee springs 70, and the springs are of sufficient strength, such that rearward movement of the front and rear easels 18, 26 occurs before the front spring 70 is overcome to permit pivotal movement of the linkage plate 55 about pivotal axle 61. Upon the easels 18, 26 being moved rearwardly, i.e., pivoted rearwardly upon their axle structures 21 (FIG. 1), until the outermost chart 101 upon the rear easel 26 is brought into contact with the friction rollers 33 of the rear roller structure 28 (as shown in FIG. 6), the plunger 86 of the rear solenoid 85 continues its rearward movement, by pivoting the linkage plate 55 downwardly upon its rear axle 61 or in a clockwise direction as viewed in FIGS. 4 and 6 and pulling the front plunger rod 68 in a downward direction against its associated spring 70, until the plunger 86 of the rear solenoid 85 "bottoms," or reaches its fully retracted position (FIG. 6). The solenoids 84, 85 operate most efficiently when they are permitted to completely retract, or "bottom out," and the action of the bungee springs 58, 59 permit such complete retraction regardless of the number of charts 101 on the easels 18, 26. Also, it is desired to bring the roller structures 27, 28 into contact with the adjacent charts 101 at a substantially uniform pressure regardless of the number of charts upon the respective easel, and, if the bungee spring structures 58, 59 were omitted, varying forces would be applied according to how far the solenoid plungers 86 retracted. In the present construction, part of the force generated by the rear solenoid 85 is thus expended in overcoming the compressional spring 70 of the front bungee spring structure 58, but the amount of force transmitted to the rear easel 26, and thus, the amount of force exerted by the friction rollers 33 of the rear roller structure 28 upon the adjacent display charts 101, is approximately constant no matter how many charts are stacked upon the rear easel 26, since the front spring structure 58 permits substantial travel of its associated plunger 68 relative to the difference in rearward movement at the linkage plate 55 caused by the presence or absence of display charts 101 upon the rear easel 26. The positioning of the bungee springs 58, 59 (FIG. 4) at a vertical distance above the pivotal axis 21 of approximately 20 to 30 percent of the respective easel heights is appropriate to ensure sufficient pivotal travel of the easels 18, 26 as a result of the linear travel of the solenoids 84, 85 used in the present embodiment. Thus, solenoids with greater travel would require the bungee springs 58, 59 to be placed relatively higher on the easels 18, 26 to obtain the same degree of pivotal movement. The placing of solenoids 84, 85 below the easels 18, 26, rather at a position, for example, between the easels, permits spacing the easels relatively close together such that the overall thickness of the chart display apparatus 10 is minimized, an advantage where floor space is limited or where the display apparatus is to be mounted in a wall.

The retraction of the plunger of the rear solenoid 85 and the rearward movement of the linkage plate 55 also causes the rear centering plunger 82 to be pressed against the rear easel 26 and pushed inwardly against the centering spring 80 (the pin 79 within the slot 83 of the front centering plunger 81 acting to restrain the front plunger from being moved forwardly by the spring 80). The compressed centering spring 80 then acts to restore the easels 18, 26, linkage plate 55, and solenoid plungers 86 to the centered or neutral position shown in FIG. 4 upon current to the solenoids 84, 85 being cut off, as will be described.

As the connecting bar 87 is displaced rearwardly, and upon the plunger 86 of the rear solenoid 85 being fully retracted, the lug 90 depresses the sensing button of the rear microswitch 92; the closing of the rear microswitch 92 conducts current to the chart drive motor 34 with a polarity such that the motor rotates the roller structures 27, 28 in a counterclockwise direction, as viewed in FIGS. 4 and 6, or such that the portion of the rear roller structure 28 which confronts the adjacent rear easel 26 moves in an upward direction. The friction rollers 33 of the rear roller structure 28 being in firm contact with the charts 101, the outermost chart is driven upwardly, as shown in FIG. 6, toward and against the deflecting shield 44 and deflected downwardly upon the front easel 18 for viewing from a position in front of the front easel. Upon the chart 101 contacting the tubular roller 46, the roller readily rotates upon its axis, offering little resistance to the passage of the chart, because of its lightweight construction, and minimizing resistance to the passage of the chart. The charts 101 tend to spring outwardly to a flat configuration, and in most cases will thus tend to brush against the rollers 33 of the front roller structure 27. Because the front roller structure 27 is rotating in a counterclockwise direction, charts touching it will be guided inwardly and downwardly onto the front easel 18. The first relay 97 is adjusted such that the forward cycle stops, i.e., the rear solenoid 85 is cut off and its plunger released opening microswitch 92 to shut off the motor as the chart passes the rear roller structure 28; gravity, the inertia of the chart 101, and the inertia of the tubular roller 46 then carry the chart over the tubular roller and onto the front easel 18. Thus, the next chart upon the stack of charts 101 is not carried over also unless the forward control switch 49 is again depressed. The passage of the chart 101 over the tubular roller 46 causes the first and second, normally closed microswitches 48, 53 to open and to thus prevent recycling of the first relay 97, in case the control switch 95 or 96 is prematurely closed, until the previous chart has passed over the tubular roller 46. By maintaining the first control switch 95 in a depressed or closed position, however, after the chart passes the roller 46 the first microswitch 48 is again closed and the first relay 97 will repeat its cycle and thus show the remaining charts sequentially.

An important advantage of the display apparatus 10 is its capability of reversing the sequence and returning previously shown carts to view when required. That is, by closing one of the rearward control switches 96, 100, the second time delay relay 98 and the front solenoid 84 are actuated. The drive motor 34 is then operated in a reversed direction such that the roller structures 27, 28 rotate in a clockwise direction and such that the outermost chart on the front easel 18 is engaged by the front roller structure and transported upwardly and onto the rear easel 26.

The operation of the modified or second embodiment (FIGS. 9-11) is similar to that of the first except that the roller structures 27, 28 are moved into contact with the respective, adjacent charts 101 rather than the charts and easels 27, 28 being moved toward the roller structures. Upon actuation of the rear solenoid 85, for example (FIG. 9), the connecting bar 87 is urged in a rearward direction and, in turn, urges the steel connecting rod 108 rearwardly. The frames 103 are thus pivoted about their axles 39 in a counterclockwise direction, as viewed in FIG. 9, or such that the rear roller structure 28 is moved toward and into contact with the rear easel 26 and into contact with any charts on the rear easel. The steel connecting rod 108 has sufficient flexibility to permit the solenoids 85, 84 to "bottom" upon the roller structures 27, 28 being in contact with the respective, adjacent easels 18, 26, and thus functions similarly to the bungee springs 58, 59 of the first embodiment. The outermost chart 101 on the rear easel 26 is gripped by the rear roller structure 28 and moved upwardly, as in the first embodiment, against the deflecting shield 44, the deflecting shield and inner shield 107 serving to guide the chart downwardly onto the front easel 18.

In each embodiment, the advantage of forward and rearward movement of the charts is obtained. Further, both embodiments are of relatively simple and dependable construction relative to prior art devices. For example, the charts are not driven by a series of roller structures as they are moved to the front easel, but rather, are contacted only by one roller structure, i.e., the rear roller structure. Thus, adjustment and alignment of the rollers and easels is much easier than in display devices which require a multiplicity of rollers and guiding means.

While only one embodiment of the invention, together with modifications thereof, has been described in detail herein and shown in the accompanying drawing, it will be evident that various further modifications are possible in the arrangement and construction of its components without departing from the scope of the invention'

What is claimed is:

1. A display apparatus for successively exhibiting individual ones of a plurality of charts, the apparatus comprising:

a first means for supporting a stack of charts such that the charts are in parallel alignment and substantially planar configuration;

a second means for supporting a stack of charts in parallel alignment and substantially planar configuration, the first and second supporting means being relatively positioned such that any charts on the first supporting means are adjacent and approximately parallel to any charts on the second supporting means but facing in the opposite direction;

means for moving, in a direction parallel to the adjacent charts, the frontmost chart most remote from either one of the chart supporting means; and means for deflecting said frontmost chart approximately 180 degrees and onto the other chart supporting means.

2. The apparatus of claim 1, wherein the means for moving the frontmost chart from either chart supporting means includes, at each chart supporting means, a friction roller adjacent the supporting means and further includes:

means for rotating each roller about its axis, and means for selectively moving either one of the rollers into firm contact with the respective adjacent frontmost chart for frictionally gripping said chart and moving it in a direction parallel to the adjacent charts.

3. The apparatus of claim 1, wherein the means for moving the frontmost chart from either chart supporting means includes, at each chart supporting means, a friction roller adjacent the supporting means, means for rotating the roller about its axis, and means for moving the respective, adjacent supporting means and any charts thereon toward the adjacent roller such that the frontmost of any charts on the supporting means are brought into firm contact with the roller for causing the roller to frictionally grip the chart and move it in a direction parallel to the adjacent charts.

4. The apparatus of claim 1, wherein the means for deflecting said frontmost chart comprises a curved sheet of material configured in approximately semicylindrical shape and having a smooth, inner surface for slideably deflecting the charts, and wherein the first and second means for supporting the charts are adapted to position the charts adjacent the inner surface of the deflecting means.

5. A display apparatus for exhibiting individual ones of a plurality of display charts of substantially identical height, the apparatus comprising:

a first easel adapted to support a plurality of display charts in parallel alignment and substantially planar configuration;

a second easel adapted to support a plurality of display charts in parallel alignment and substantially planar configuration;

means connected to the first and second easels for supporting the easels in substantially upright positions, in register with each other, and facing in mutually opposite directions for permitting potioning of any charts on the first easel substantially in register with any charts on the second easel;

means for moving, in an upward direction, the frontmost chart most remote from either one of the easels; and deflecting means for reversing the direction of movement of said frontmost chart and for guiding it onto the other easel.

6. The apparatus recited in claim 5, wherein the first and second easels each has a substantially flat front face for supporting any adjacent charts in substantially planar configuration and parallel to the respective front face, and wherein the means for moving the frontmost chart comprises:

a pair of rollers, each having a cylindrical, outer surface having a high coefficient of friction, means for positioning each roller adjacent and in front of a respective one of the easels with the longitudinal axis of the roller extending horizontally and parallel to the front face of the respective easel, means for bringing a selected one of the rollers and the frontmost one of any charts on the respective adjacent easel into mutual contact, and means for rotating each roller about its longitudinal axis in a rotational direction such that the portion of its outer surface which confronts the respective adjacent easel moves in an upward direction.

7. The apparatus of claim 6, further comprising means for preventing rotation of the rollers by the rotating means until the selected one of the rollers and the frontmost chart on the respective adjacent easel have been brought into mutual contact.

8. The apparatus of claim 6, wherein the means for selectively bringing one of the rollers and the frontmost one of any charts on the respective adjacent easel into mutual contact comprises a means for moving the respective roller toward the respective easel and charts.

9. The apparatus of claim 6, wherein the means for positioning the rollers includes a frame supporting both rollers and means for positioning the frame adjacent to and above both easels, the frame being pivotally mounted to its supporting means on a pivotal axis parallel to, above, and approximately centered between the rollers, and wherein the means for selectively bringing one of the rollers and the frontmost one of any charts on the respective adjacent easel into mutual contact comprises means for pivoting the frame and the respective roller toward the selected easel.

10. The apparatus of claim 6, wherein the means for selectively bringing one of the rollers and the frontmost one of any charts on the respective adjacent easel into mutual contact comprises a means for moving the respective easel and charts toward the respective roller.

11. The apparatus of claim 6, wherein the rollers are each positioned adjacent an upper portion of the respective adjacent easel and wherein the means for selectively bringing one of the rollers and the frontmost of any charts on the respective adjacent easel into mutual contact includes, at each easel, a pivoting means connected to a lower portion of the easel and extending to the easel supporting means for permitting at least the uppermost portion of the respective easel to swing toward and away from the respective roller adjacent its front face, the pivoting means having rotational axes parallel to each other and to the longitudinal axes of the rollers, and means for pivoting both easels upon their pivoting means in a selected direction such that the frontmost of any charts on a selected first one of the easels is brought into contact with the respective roller adjacent the front face of that easel and, alternately, for pivoting both easels in an opposite direction such that the frontmost of any charts on a second one of the easels is brought into contact with the respective roller adjacent the front face of the second easel.

12. The apparatus of claim 11, wherein the means for pivoting both easels includes a linkage plate disposed between the first and second easels and with its side surfaces perpendicular to the front faces of the front and rear easels, the linkage plate having front and rear corner portions which are pivotally connected to the first and second easels, respectively, upon pivotal axes which are parallel to each other and to both the rollers.

13. The apparatus of claim 12, wherein the means for pivoting both easels further includes first and second bungee springs disposed between the easels and connected, respectively, to the first and second easel, and wherein the linkage plate front and rear corner are connected, respectively, to the first and second easels through the first and second bungee springs.

14. The apparatus of claim 12, wherein the means for pivoting both easels further includes front and rear actuating means, and wherein the linkage plate is connected, at a portion thereof between and below the front and rear corner portions, to the front and rear actuating means.

References Cited

UNITED STATES PATENTS

| | | | |
|---|---|---|---|
| 2,262,183 | 11/1941 | Hutchinson | 40—36 |
| 3,310,897 | 3/1967 | Grover | 40—36 |

ROBERT W. MICHELL, Primary Examiner

L. ANTEN, Assistant Examiner